(12) United States Patent
Maghnani et al.

(10) Patent No.: US 12,511,305 B1
(45) Date of Patent: Dec. 30, 2025

(54) INTELLIGENT SYSTEM FOR SCALABLE NETWORK DATA TRANSMISSION

(71) Applicant: BANK OF AMERICA CORPORATION, Charlotte, NC (US)

(72) Inventors: Vinod Maghnani, Haryana (IN); Nekkanti Tulasi Bhavani, Telangana (IN); Christina Caruso, New York, NY (US); Vijayakumar Surisetti, Tamil Nadu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/755,173

(22) Filed: Jun. 26, 2024

(51) Int. Cl.
*G06F 16/25* (2019.01)

(52) U.S. Cl.
CPC .................. *G06F 16/254* (2019.01)

(58) Field of Classification Search
CPC ...................................... G06F 16/254
See application file for complete search history.

(56) References Cited

U.S. PATENT DOCUMENTS

| | | |
|---|---|---|
| 6,208,990 B1 | 3/2001 | Suresh |
| 7,747,563 B2 | 6/2010 | Gehring |
| 8,719,769 B2 | 5/2014 | Castellanos |
| 9,396,037 B2 | 7/2016 | Morsi |
| 9,542,461 B2 | 1/2017 | Bhide |
| 9,607,060 B2 | 3/2017 | Li |
| 10,262,049 B2 | 4/2019 | Chintakayala |
| 11,269,911 B1 * | 3/2022 | Jones ................ G06F 16/254 |
| 11,334,593 B2 | 5/2022 | Zorin |
| 11,487,776 B2 | 11/2022 | Bodziony |
| 11,586,645 B2 | 2/2023 | Wang |
| 11,681,608 B2 | 6/2023 | Sharma |
| 11,734,295 B2 | 8/2023 | Ocher |
| 11,803,798 B2 | 10/2023 | Ramanathan |
| 11,989,199 B2 | 5/2024 | Mudigonda |
| 12,050,616 B2 | 7/2024 | Hu |
| 12,189,588 B1 * | 1/2025 | Liu ................... G06F 16/215 |
| 12,298,995 B1 * | 5/2025 | Möller ............... G06F 16/254 |
| 2009/0177671 A1 * | 7/2009 | Pellegrini ............ G06F 9/5038 |
| 2017/0213257 A1 * | 7/2017 | Murugesan ......... G06Q 30/0275 |
| 2020/0026710 A1 * | 1/2020 | Przada ................ G06N 20/00 |
| 2022/0083864 A1 | 3/2022 | Laterre |
| 2022/0092464 A1 | 3/2022 | Wistuba |
| 2023/0071201 A1 | 3/2023 | Fan |
| 2023/0281212 A1 | 9/2023 | Zorin |
| 2024/0281419 A1 * | 8/2024 | Alfaras .............. G06F 16/215 |
| 2024/0296169 A1 | 9/2024 | Fan |

\* cited by examiner

*Primary Examiner* — Courtney Harmon
(74) *Attorney, Agent, or Firm* — Moore & Van Allen PLLC; Anup Lyer

(57) ABSTRACT

Systems, computer program products, and methods are described herein for scalable network data transmission within a network environment. An example system receives a plurality of ETL tasks and task characteristics associated with each ETL task. In addition, the example system captures network environment configuration at periodic intervals. Using a machine learning (ML) model, the example system may dynamically determine additional secondary ETL pipelines to process the plurality of ETL tasks. Once the appropriate secondary pipelines are identified, the system executes the ETL tasks using both the primary and the secondary pipelines, ensuring efficient and adaptable task processing within a network environment.

20 Claims, 4 Drawing Sheets

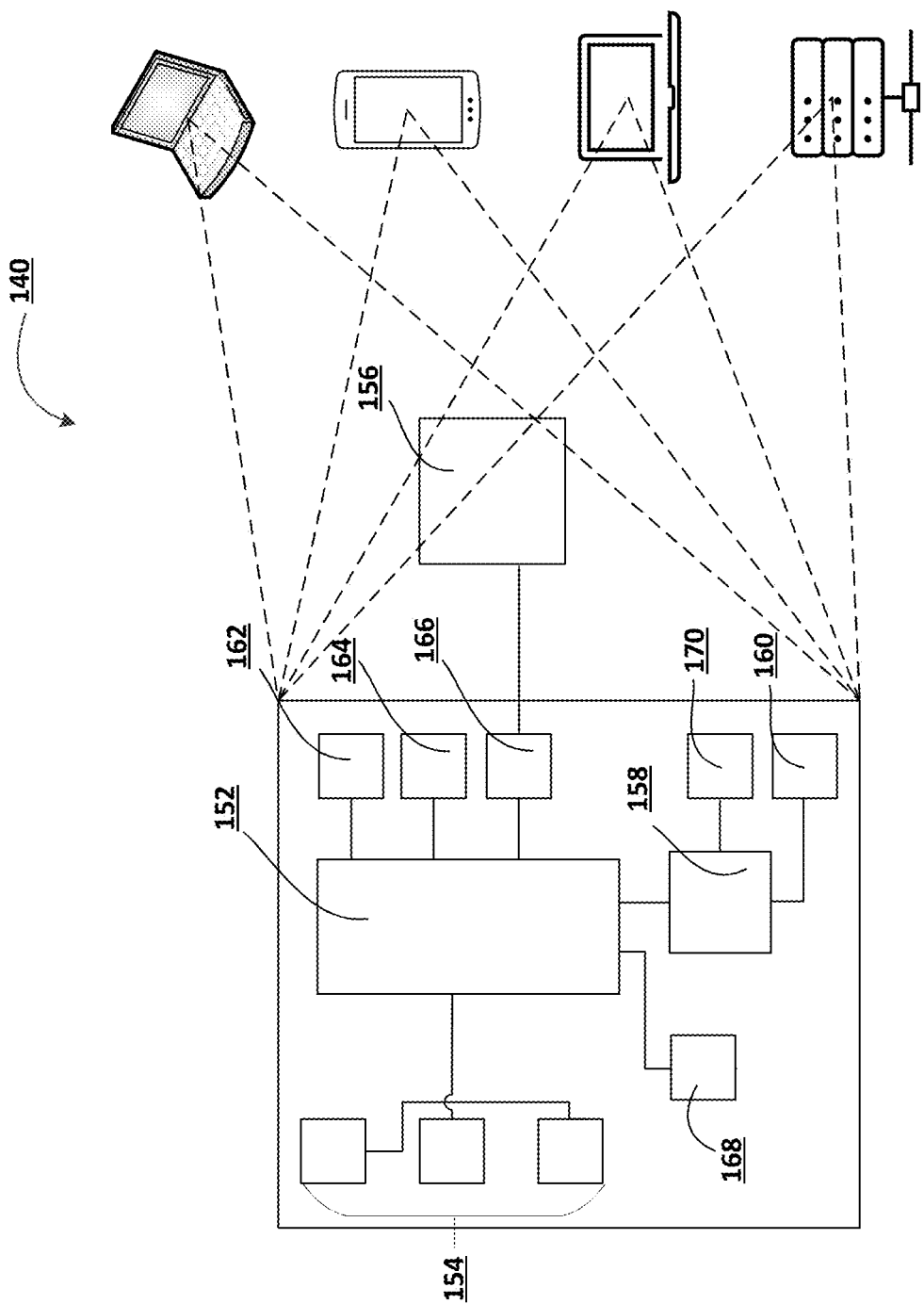

INTELLIGENT SYSTEM FOR SCALABLE NETWORK DATA TRANSMISSION

TECHNOLOGICAL FIELD

Example embodiments of the present disclosure relate to an intelligent system for scalable network data transmission.

BACKGROUND

With the increasing demand for real-time data processing, it is essential to develop efficient methods for transmitting large amounts of data across networks. Conventional solutions often rely on manual configuration and optimization, which can be time-consuming and may not adapt well to changing network conditions.

Applicant has identified a number of deficiencies and problems associated with an intelligent system for scalable network data transmission. Many of these identified problems have been solved by developing solutions that are included in embodiments of the present disclosure, many examples of which are described in detail herein.

BRIEF SUMMARY

Systems, methods, and computer program products are provided for an intelligent system for scalable network data transmission.

In one aspect, a system for an intelligent system for scalable network data transmission is presented. The system comprising: a processor; a non-transitory storage device containing instructions that, when executed by the processor, cause the processor to: receive a plurality of Extract Transform Load (ETL) tasks for execution using a primary ETL pipeline; determine task characteristics associated with each ETL task; capture configuration information associated with the network environment at periodic time instants; dynamically determine, using a machine learning (ML) model, one or more secondary ETL pipelines to process the plurality of ETL tasks based on the task characteristics and the configuration information at each time instant; and execute the plurality of ETL tasks using the primary ETL pipeline and the one or more secondary ETL pipelines.

In some embodiments, the instructions, when executed, further cause the processor to determine task size, priority, and confidentiality requirements associated with each ETL task based on the task characteristics; and allocate each ETL task to a corresponding ETL pipeline for execution based on the task size, priority, and confidentiality requirements.

In some embodiments, the instructions, when executed, further cause the processor to dynamically configure each ETL pipeline based on at least the task size, priority, and confidentiality requirements of allocated ETL tasks.

In some embodiments, the instructions to dynamically configure each ETL pipeline, when executed, further cause the processor to: determine data pre-processing requirements associated with the execution of each ETL task based on the task size, priority, and confidentiality requirements; determine data pre-processing actions based on the data pre-processing requirements; and configure each ETL pipeline to implement the data pre-processing actions when executing an ETL task allocated thereto.

In some embodiments, the task characteristics comprise at least one of an extraction source information, load requirements, and transformation requirements, wherein the extraction source information comprises at least one of source data reference address, source data identifier, source data volume, source data type, source data security, and source data dependency, wherein the transformation requirements comprise at least one of a computational complexity, execution time, and resource requirements, and wherein the load requirements comprise at least a loading reference address.

In some embodiments, wherein the instructions, when executed, further cause the processor to receive known ETL tasks, known task characteristics associated with each known ETL task, configuration information associated with the network environment at a time of execution of each corresponding known ETL task, number of secondary pipelines associated with the execution of each known ETL task, and performance metrics associated with the execution of each known ETL task to generate a training dataset; and train the ML model using the training dataset.

In some embodiments, the instructions, when executed, further cause the processor to: continuously monitor performance metrics associated with the execution of each ETL task; and periodically retrain the ML model based on the performance metrics associated with the execution of each ETL task.

In some embodiments, the performance metrics comprises at least one of a task completion time, resource utilization, data throughput, error rates, latency, scalability, success rate, queue time, data accuracy and integrity, and/or network bandwidth utilization.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
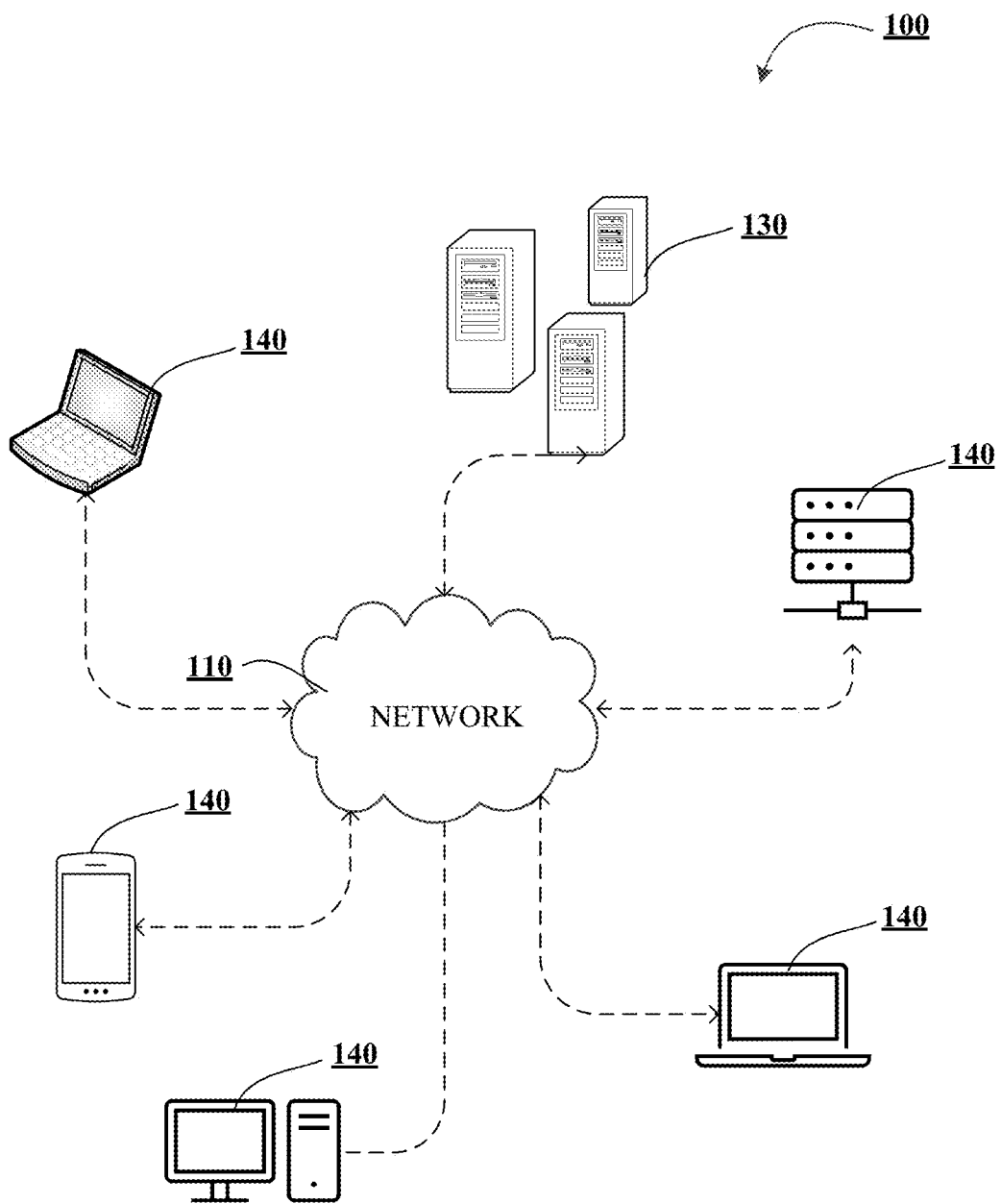
Figure 1B:
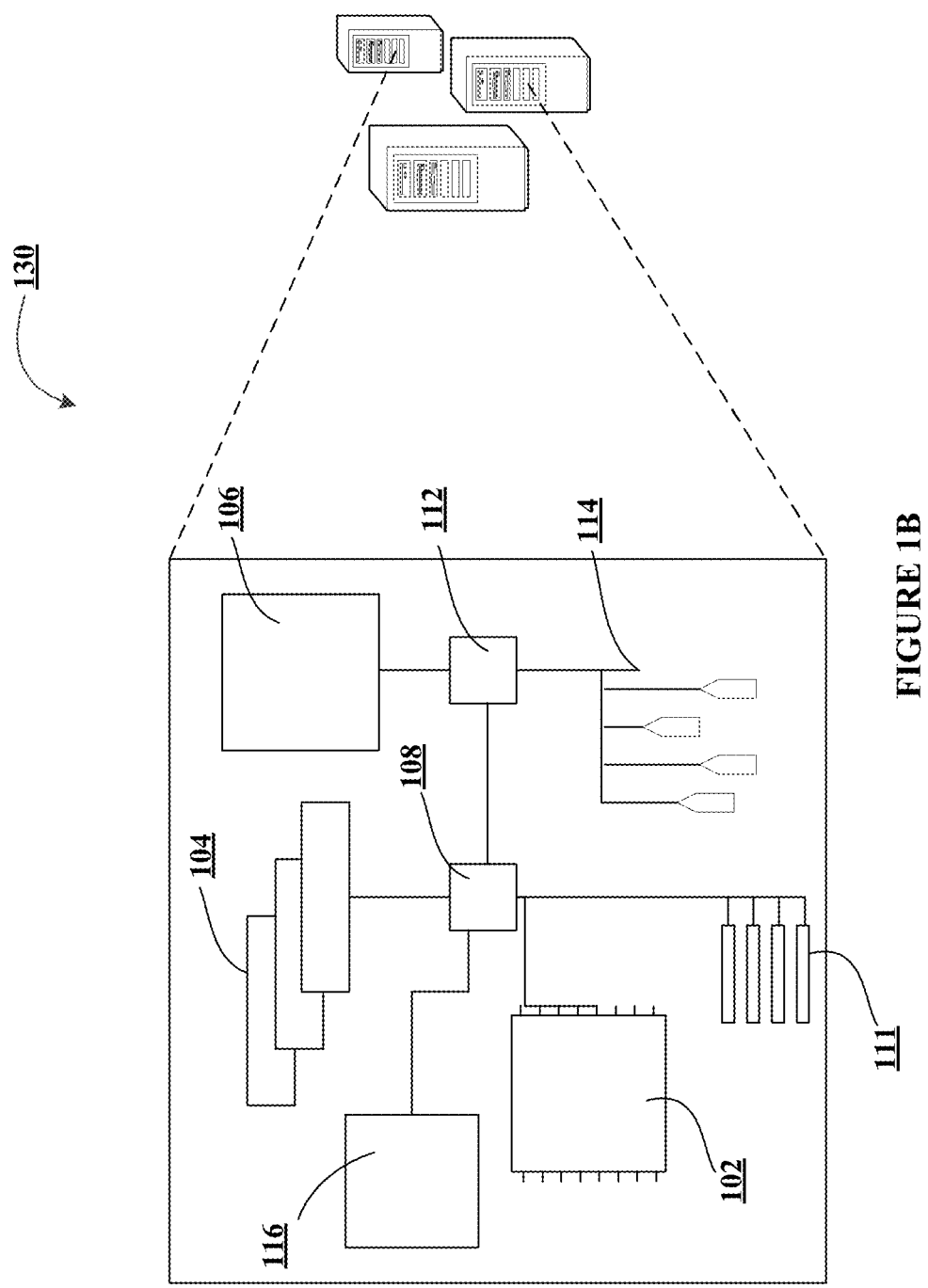

FIGS. 1A-1C illustrates technical components of an exemplary distributed computing environment for an intelligent system for scalable network data transmission, in accordance with an embodiment of the invention.

Figure 2:
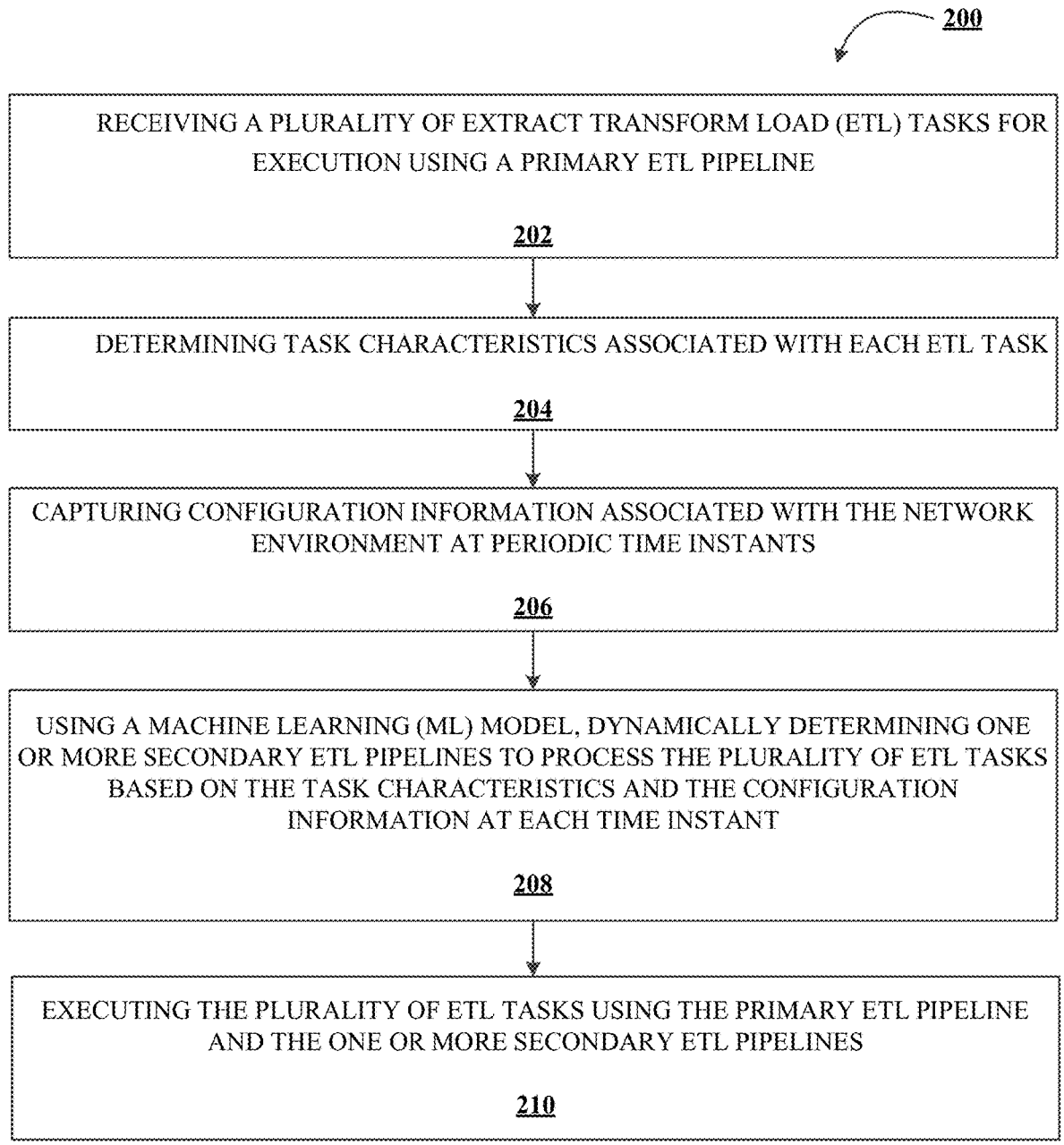

FIG. 2 illustrates a process flow for an intelligent system for scalable network data transmission, in accordance with an embodiment of the invention.

DETAILED DESCRIPTION

Overview

The present invention relates to a system for scalable network data transmission within a network environment. An example system may be configured to efficiently process a plurality of Extract, Transform, Load (ETL) tasks using a primary ETL pipeline and one or more secondary ETL pipelines. The example system may receive a set of ETL tasks and their associated characteristics, such as extraction source information, transformation requirements, and load requirements. Based on these characteristics, the example system may dynamically determine which ETL pipeline to use for each task, taking into account factors such as task size, priority, and confidentiality requirements.

The example system may use machine learning (ML) models to determine the optimal ETL pipeline configuration at each time instant. The ML model may be trained using a training dataset generated from known ETL tasks, their characteristics, and performance metrics associated with their execution. Training the ML model in such a way, may allow the example system to adapt to changing network conditions and optimize ETL task processing in real-time. Additionally, the example system continuously monitors performance metrics during execution and periodically retrains the ML model to ensure optimal pipeline configuration.

The example system's ability to dynamically determine the most suitable ETL pipeline for each task enables efficient processing of a large volume of data transmission tasks within a network environment. This is particularly useful in scenarios where network conditions are dynamic or unpredictable, such as during peak usage periods or when dealing with large amounts of data. The system's scalability and adaptability make it an ideal solution for organizations that require high-performance data processing capabilities.

The present invention provides a flexible and adaptive framework for scalable network data transmission. By leveraging machine learning models and dynamically configuring ETL pipelines based on task characteristics and network conditions, the system can optimize data processing efficiency, reduce latency, and improve overall performance.

The technical problem addressed by this invention is the inefficient use of computing resources, such as processing power, storage capacity, and network bandwidth, in a network data transmission environment. Traditional ETL (Extract, Transform, Load) pipelines often require manual configuration and tuning, which can lead to suboptimal resource allocation and reduced performance. Furthermore, these traditional pipelines may not be able to adapt dynamically to changing network conditions or task characteristics, leading to decreased accuracy and increased errors.

The technical solution described herein addresses this problem by providing a scalable and adaptive ETL pipeline system that uses machine learning (ML) models to dynamically determine the optimal configuration for each ETL task. By capturing configuration information about the network environment at periodic time instants and using ML models to determine the best ETL pipeline configuration, the system can reduce the number of resources required to execute each ETL task, thereby improving efficiency and reducing errors. Furthermore, the technical solution described herein uses a rigorous computerized process to perform specific tasks and/or activities that were not previously performed, such as dynamically configuring ETL pipelines based on task characteristics and network conditions. In specific implementations, the technical solution bypasses a series of steps previously implemented, thus further conserving computing resources.

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Thus, it should be understood that each block of the block diagrams and flowchart illustrations may be implemented in the form of a computer program product; an entirely hardware embodiment; an entirely firmware embodiment; a combination of hardware, computer program products, and/or firmware; and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments may produce specifically-configured machines performing the steps or operations specified in the block diagrams and flowchart illustrations. Accordingly, the block diagrams and flowchart illustrations support various combinations of embodiments for performing the specified instructions, operations, or steps.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, satisfied, etc.

Example System Environment

FIGS. 1A-1C illustrate technical components of an exemplary distributed computing environment for an intelligent system for scalable network data transmission 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file servers, or the like, as well as a range of digital computing devices, including laptops, desktops, video recorders, audio/video players, radios, workstations, and/or the like. Additionally, system 130 may include a variety of auxiliary network devices, encompassing wearable devices, Internet-of-things (IoT) devices, electronic kiosk devices, entertainment consoles, mainframes, and/or the like, in any combination to cater to the complexity and diversity of contemporary digital ecosystems.

The end-point device(s) 140 may encompass an array of electronic devices, such as personal digital assistants, cellular telephones, smartphones, laptops, desktops, and merchant input devices like point-of-sale (POS) systems, electronic payment kiosks, and automated teller machines (ATMs). End-point device(s) 140 may also include edge devices like routers, routing switches, integrated access devices (IAD), and/or the like, and devices capable of interfacing with 5G networks, delivering enhanced data processing and connectivity.

The network 110 may include a distributed network architecture that spans a variety of network types, facilitating a cohesive data communication network that can be managed jointly or individually. The network architecture supports shared communication as well as distributed processing across platforms such as telecommunication networks, local area networks (LAN), wide area networks (WAN), global area networks (GAN), the Internet infrastructure, and/or the like. Network 110 may also integrate emerging networking technologies, including software-defined networking (SDN), network function virtualization (NFV), and next-generation wireless communication standards like 5G. Network 110 may employ secure or unsecure, as well as wireless, wired, and optical interconnection technologies, and/or the like, to accommodate a spectrum of communication and processing needs.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow for an intelligent system for scalable network data transmission 200, in accordance with an embodiment of the invention. As shown in block 202, a plurality of Extract Transform Load (ETL) tasks for execution are received using a primary ETL pipeline. Each ETL task may refer to a data management and warehousing process in which data is extracted from various sources, transformed into a suitable format, and loaded into a target database or data warehouse. A primary ETL pipeline may refer to the main processing route for ETL tasks, ensuring that data extraction, transformation, and loading operations are executed efficiently under standard operating conditions. The primary ETL pipeline may be configured to receive ETL tasks from various network devices, endpoint devices, user input devices, servers, and/or the like. The primary ETL pipeline may receive ETL tasks from one or more networks, including distributed networks for execution. The ETL tasks may be received via network transmissions in the form of data packets through the primary ETL pipeline. In some embodiments, the primary ETL pipeline may further include a queue for receiving and storing the ETL tasks, whereby the ETL tasks are thereafter pre-processed, prioritized, rejected for transmission, and/or the like.

As shown in block 204, the task characteristics associated with each ETL task are determined. The task characteristics may refer to the specific attributes and requirements associated with each ETL task that guide its processing within an ETL pipeline. These characteristics include various parameters that define the nature, priority, and handling of the ETL task. The task characteristics may include an extraction source information, load requirements, and transformation requirements. The extraction source information may refer to the process of extracting data from a source. The extraction source information may include at least one source data reference address, such as the location of the source data; a source data identifier, which may indicate the nature of the data; a source data volume, which may correspond to the size of the data; a source data type, which may indicate data properties; source data security, which may indicate the security requirements to access the data at the source and thereafter extract and/or transform the data; and source data dependency, which may refer to a relationship between data in the source. The transformation requirements may include computational complexity, which may refer to computing resource utilization, technical difficulties, transformation logic, and/or the like in transforming the data; execution time, which may refer to time for completing the transformation; and resource requirements, which may refer to technical resources, human capital, and/or the like. The load requirements may include at least a loading accuracy target, process automation to execute loads, and a loading reference address, which may include a target database, reference address on a distributed ledger, and/or the like.

As shown in block 206, the configuration information associated with the network environment is captured at periodic time instants. The configuration information may include various network parameters and settings that may be used to determine optical processing of ETL tasks. The configuration information may include, but is not limited to, network settings, which cover network topology, bandwidth allocation, latency, and quality of service (QOS) settings; mapping logic, which may include the transformation rules and data flow paths that dictate how extracted data is processed and moved to its destination; security settings, including protocols and measures to ensure data confidentiality and integrity, are assessed, along with resource allocation information, detailing how network resources such as servers and storage are utilized; flows, which may outline the specific stages data undergoes from extraction to loading, including any intermediate transformations and validations; latency, to measure the delay experience in data transmission; controls, which may include error detection and correction protocols, performance monitoring tools; traffic patterns, error rates, and the operational status of network devices like routers, switches, and servers; and resource allocation strategies to ensure the ETL process runs efficiently and can adapt to changes in the network environment.

To capture the configuration information, the system may utilize a network monitoring device. The network monitoring device may be used to continuously monitor network traffic and take periodic snapshots of the network activity. In example embodiments, the network monitoring device may be configured to capture network traffic data using techniques such as packets sniffers, network test access points (TAPs), switch port analyzers (SPAN) ports, network probes, packet capture solutions, information scrapers, flow data analysis, deep packet inspection (DPI), and/or the like. The network monitoring device, in some embodiments, may be configured to record network activity by taking real-time snapshots at time instants.

As shown in block 208, one or more secondary ETL pipelines are dynamically determined at each time instant using a machine learning (ML) model based on the task characteristics and the configuration information. Upon evaluating the task characteristics and configuration information, the ML model may determine that there the primary ETL pipeline alone may not be able to efficiently execute an ETL task. For example, a given ETL task may involve confidential data, such as personally identifiable information, consumer data, trade secrets, and/or confidential intellectual property, and thus may require a more secure network transmission pathway to ensure data privacy and compliance with regulatory standards. Another scenario might involve an ETL task with elevated priority due to organizational goals or time-sensitive requirements. For instance, a task that supports a critical business function or a high-stakes project might necessitate expedited processing times to meet stringent deadlines. Additionally, certain ETL tasks may involve large volumes of data that exceed the bandwidth or capacity of the primary ETL pipelines. For example, during peak usage periods, the primary pipelines might experience congestion, resulting in inadequate average network transfer speeds. In these situations, relying solely on the primary ETL pipelines could lead to delays and inefficiencies. To address these varying needs, the ML model may be used to dynamically determine one or more secondary ETL pipelines, ensuring that each task is processed with the optimal configuration. This approach not only maintains high performance and security standards but also enhances the overall scalability and adaptability of the data transmission system.

In some embodiments, to make such a determination, the ML model may be trained using known ETL tasks, known task characteristics associated with each known ETL task, configuration information associated with the network environment at a time of execution of each corresponding known ETL task, number of secondary pipelines associated with the execution of each known ETL task, and performance metrics associated with the execution of each known ETL task. Once trained, the ML model using the training dataset, the model may be used to determine one or more secondary ETL pipelines to process the ETL task.

Training the ML model requires selecting the right machine learning algorithm to ensure optimal performance. Selecting the right machine learning algorithm may depend on a number of different factors, such as the problem statement and the kind of output needed, type and size of the data, the available computational time, number of features and observations in the data, and/or the like. ML algorithms may refer to programs that are configured to self-adjust and perform better as they are exposed to more data. To this extent, ML algorithms are capable of adjusting their own parameters, given previous performance in making prediction about a dataset.

The ML algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

The ML model may be trained using repeated execution cycles of experimentation, testing, and tuning to modify the performance of the ML algorithm and refine the results in preparation for deployment of those results for consumption or decision making. The ML model may be tuned by dynamically varying hyperparameters in each iteration (e.g., number of trees in a tree-based algorithm or the value of alpha in a linear algorithm), running the algorithm on the data again, and then comparing its performance on a validation set to determine which set of hyperparameters results in the most accurate model. The accuracy of the model is the measurement used to determine which set of hyperparameters is best at identifying relationships and patterns between variables in a dataset based on the input, or training data. A fully trained ML model is one whose hyperparameters are tuned and model accuracy maximized.

In addition to determining the secondary pipelines for executing the ETL tasks, the system may configure each secondary pipeline according to specific requirements of each ETL task. For example, the system may determine data pre-processing requirements for each ETL task based on factors such as task size, priority, and confidentiality needs, and subsequently configure secondary ETL pipelines to implement the necessary data pre-processing actions during the execution of the allocated ETL task. These data pre-processing actions may include compressing data packets to expedite processing, masking data to protect confidential information, obfuscating data to remove sensitive information, and encrypting data to enhance security. In another example, the system may configure secondary ETL pipelines based on at least the task size, priority, and confidentiality requirements of each ETL task. The task size may be associated with the total effort required to execute the task, the priority may be associated with technical priorities and organizational goals for the task execution, and the confidentiality requirements may be associated with the security requirements of the request itself, the source data, the transformation requirements, and/or the destination address. This tailored configuration helps in allocating each ETL task to the most suitable secondary ETL pipeline, ensuring efficient processing, enhanced security, and alignment with organizational priorities. By dynamically adjusting the ETL pipelines (primary and secondary ETL pipelines), the system optimizes overall performance and meets the specific needs of each ETL task.

As shown in block 210, the plurality of ETL tasks is executed using the primary ETL pipeline and the one or more secondary ETL pipelines. As noted, the system may determine which ETL pipeline to utilize or whether to utilize a combination of ETL pipelines, depending upon the task characteristics and the configuration information. In some embodiments, the data extraction may execute via update notification, incremental extraction, full extraction, and/or the like. After extracting data, the system may transform and consolidate data in a staging area for preparation for loading to the target data site.

At the staging area, the system may encrypt data, remove errors, empty data fields, and/or simplify data to improve the data quality and security. In some embodiments, data is cleansed by removing errors and duplicate records. Additional actions may comprise mapping source data to the data format at the target site and converting disparate data formats to a unified format for facilitating efficient loading downstream, according to some embodiments. In other embodiments, derivation may be employed to generate new values based upon existing data values. When processing large data sets, the system may utilize summarization to create a smaller dataset, which improves processing time and efficiency during the loading phase. Also, joins and splits may be utilized in the staging area in some embodiments to further transform the data. In some instances, the conventional transformation logic may be inadequate to execute the transforming phase at the staging area. To resolve this problem, the system may intelligently and autonomously generate transformation logic based on the configuration information and the task characteristics. In some embodiments, the AI engine may also be configured to generate transformation logic based on the configuration information and the task characteristics.

After transformation is complete at the staging area, the system executes the loading phase of the ETL task, wherein the data is loaded into a new designated location. The designated location may be a database, data warehouse, data lake, node in a ledger, reference address in a distributed ledger, and/or the like. The loading may be executed via full load, streaming incremental load, batch incremental load, and/or the like. In some embodiments, based on the task characteristics and configuration information, loaded encrypted data is thereafter decrypted using cryptographic keys, decryption keys, and/or a decryption algorithm. When the loading successfully completes, the ETL task is fully executed. With the data stored in the target repository location, the entity may thereafter utilize the data for further processing, transfer, and/or review, such as executing data analyses techniques to generate data visualizations and analytics, according to some embodiments.

Furthermore, in some embodiments, at least one of the source data location, staging area, and/or loading data location comprise a node in a decentralized ledger. A decentralized ledger provides enhanced security, transparency, and/or efficiencies due to trust algorithms that verify transactions on the ledger. The decentralized ledger may be based on blockchain, Tangle, a directed acyclic graph, and/or the like in some embodiments of the invention. In some embodiments, the trust algorithms require validating at least one previous transaction, such as validating previous ETL tasks, to provide enhanced safeguards against malfeasance and bad actors when accessing, transforming, and loading data. Some decentralized ledgers, such as Tangle, provide reduced costs and a scalable framework for adding new nodes, providing additional efficiencies when executing ETL tasks.

In some embodiments, the system may generate a notification indicating the successful execution of each ETL task. In one aspect, the actions associated with executing ETL tasks may include a control input configured to cause a change in the further processing of ETL tasks or other network data transfers. For example, an action may include a control input configured to turn off, restart, or turn on the system. Additionally, actions may include a control input to authenticate for system access, access user interfaces and menus, change configurations of the network, change and/or adjust ML models or associated ML algorithms, calibrate and/or train the AI engine, restrict access to ETL pipelines, delete ETL pipelines, create additional ETL pipelines, reprocess failed ETL tasks, access error logs, and/or the like. Additionally, the system may transmit control signals configured to cause a user input device to display the notification, and options to subsequently execute the actions.

To ensure the continuous improvement and adaptability of the ML model used to determine the optimal secondary ETL pipelines, the system may employ a retraining process. The retraining process may be used to maintain the ML model's accuracy and effectiveness in dynamically adjusting to changing network conditions and task requirements. In this regard, the system may continuously monitor performance metrics associated with the execution of each ETL task, and subsequently receive therewith. The performance metrics may include a task completion time, resource utilization associated with computing and technical resources, ETL pipeline speeds associated with transmission completion, data throughput across the network and ETL pipelines, error rates associated with ETL tasks, latency across the network, scalability, including scaling of new pipelines, success rates associated with extractions, transformations, and loads, queue time associated with ETL tasks pending in the queue, data accuracy and integrity, and/or network bandwidth utilization. In some embodiments, the system may receive the performance metrics and subsequently store logs associated with the performance metrics. Thereafter, the system may periodically retrain the ML model based on the performance metrics associated with the execution of each ETL task. The retraining process may result in an ML model with greater accuracy, fewer failed ETL tasks, reduced algorithmic biases, and improved processing times, resulting in an enhanced, intelligent system for scalable network data transmission.

Embodiments of the present disclosure are described below with reference to block diagrams and flowchart illustrations. Thus, it should be understood that each block of the block diagrams and flowchart illustrations may be implemented in the form of a computer program product; an entirely hardware embodiment; an entirely firmware embodiment; a combination of hardware, computer program products, and/or firmware; and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the methods described above may include fewer steps in some cases, while in other cases the methods may include additional steps. The steps of the methods and modifications to the steps of the methods described above, in some cases, may be performed in any order and in any combination.

Therefore, it is to be understood that the present disclosure is not to be limited to the specific embodiments disclosed herein. Modifications, variations, and other embodiments are intended to be included within the scope of the appended claims. The detailed descriptions and examples provided are illustrative rather than restrictive. Although specific terms are employed herein, they are used in a generic and descriptive sense only, without intent to limit the scope of the invention. The scope of the invention should be determined with reference to the appended claims, along with the full scope of equivalents to which those claims are entitled. Any modifications, enhancements, or other variations that fall within the spirit and broad scope of the claims are considered as being encompassed by the present disclosure.

What is claimed is:

1. A system for scalable network data transmission within a network environment, the system comprising:
   a processor;
   a non-transitory storage device containing instructions that, when executed by the processor, cause the processor to:
      receive a plurality of Extract Transform Load (ETL) tasks for execution using a primary ETL pipeline;
      determine task characteristics associated with each ETL task;
      determine confidentiality requirements associated with each ETL task, wherein the confidentiality requirements comprise at least security requirements of the task, source data associated with the task, transformation requirements, and a destination address;
      allocate each ETL task to a corresponding ETL pipeline for execution based on the confidentiality requirements;
      capture configuration information associated with the network environment at periodic time instants;
      dynamically determine, using a machine learning (ML) model, one or more secondary ETL pipelines in addition to the primary ETL pipeline to process the plurality of ETL tasks based on the task characteristics, the confidentiality requirements, and the configuration information at each time instant;
      configure the one or more secondary ETL pipelines to meet the confidentiality requirements of corresponding tasks; and
      execute the plurality of ETL tasks using the primary ETL pipeline and the one or more secondary ETL pipelines.

2. The system of claim 1, wherein the instructions, when executed, further cause the processor to:
 determine task size and priority associated with each ETL task based on the task characteristics; and
 allocate each ETL task to a corresponding ETL pipeline for execution based on the task size and priority.

3. The system of claim 2, wherein the instructions, when executed, further cause the processor to:
 dynamically configure each ETL pipeline based on at least the task size and priority of allocated ETL tasks.

4. The system of claim 3, wherein the instructions to dynamically configure each ETL pipeline, when executed, further cause the processor to:
 determine data pre-processing requirements associated with the execution of each ETL task based on the task size, priority, and confidentiality requirements;
 determine data pre-processing actions based on the data pre-processing requirements; and
 configure each ETL pipeline to implement the data pre-processing actions when executing an ETL task allocated thereto.

5. The system of claim 1, wherein the task characteristics comprise at least one of an extraction source information, load requirements, and transformation requirements, wherein the extraction source information comprises at least one of source data reference address, source data identifier, source data volume, source data type, source data security, and source data dependency, wherein the transformation requirements comprise at least one of a computational complexity, execution time, and resource requirements, and wherein the load requirements comprise at least a loading reference address.

6. The system of claim 1, wherein the instructions, when executed, further cause the processor to:
 receive known ETL tasks, known task characteristics associated with each known ETL task, configuration information associated with the network environment at a time of execution of each corresponding known ETL task, number of secondary pipelines associated with the execution of each known ETL task, and performance metrics associated with the execution of each known ETL task to generate a training dataset; and
 train the ML model using the training dataset.

7. The system of claim 1, wherein the instructions, when executed, further cause the processor to:
 continuously monitor performance metrics associated with the execution of each ETL task; and
 periodically retrain the ML model based on the performance metrics associated with the execution of each ETL task.

8. The system of claim 7, wherein the performance metrics comprises at least one of a task completion time, resource utilization, data throughput, error rates, latency, scalability, success rate, queue time, data accuracy and integrity, and/or network bandwidth utilization.

9. A method for scalable network data transmission within a network environment, the method comprising:
 receiving a plurality of Extract Transform Load (ETL) tasks for execution using a primary ETL pipeline;
 determining task characteristics associated with each ETL task;
 determining confidentiality requirements associated with each ETL task, wherein the confidentiality requirements comprise at least security requirements of the task, source data associated with the task, transformation requirements, and a destination address;
 allocating each ETL task to a corresponding ETL pipeline for execution based on the confidentiality requirements;
 capturing configuration information associated with the network environment at periodic time instants;
 dynamically determining, using a machine learning (ML) model, one or more secondary ETL pipelines in addition to the primary ETL pipeline to process the plurality of ETL tasks based on the task characteristics, the confidentiality requirements, and the configuration information at each time instant;
 configuring the one or more secondary ETL pipelines to meet the confidentiality requirements of corresponding tasks; and
 executing the plurality of ETL tasks using the primary ETL pipeline and the one or more secondary ETL pipelines.

10. The method of claim 9, further comprising:
 determining task size and priority associated with each ETL task based on the task characteristics; and
 allocating each ETL task to a corresponding ETL pipeline for execution based on the task size and priority.

11. The method of claim 10, further comprising:
 dynamically configuring each ETL pipeline based on at least the task size and priority of allocated ETL tasks.

12. The method of claim 11, further comprising:
 determining data pre-processing requirements associated with the execution of each ETL task based on the task size, priority;
 determining data pre-processing actions based on the data pre-processing requirements; and
 configuring each ETL pipeline to implement the data pre-processing actions when executing an ETL task allocated thereto.

13. The method of claim 9, wherein the task characteristics comprise at least one of an extraction source information, load requirements, and transformation requirements.

14. The method of claim 9, further comprising:
 receiving known ETL tasks, known task characteristics associated with each known ETL task, configuration information associated with the network environment at a time of execution of each corresponding known ETL task, number of secondary pipelines associated with the execution of each known ETL task, and performance metrics associated with the execution of each known ETL task to generate a training dataset; and
 training the ML model using the training dataset.

15. The method of claim 9, further comprising:
 continuously monitoring performance metrics associated with the execution of each ETL task; and
 periodically retraining the ML model based on the performance metrics associated with the execution of each ETL task.

16. The method of claim 15, wherein the performance metrics comprise at least one of a task completion time, resource utilization, data throughput, error rates, latency, scalability, success rate, queue time, data accuracy and integrity, and/or network bandwidth utilization.

17. A computer program product for scalable network data transmission within a network environment, the computer program product comprising a non-transitory computer-readable medium comprising code that, when executed, causes an apparatus to:
 receive a plurality of Extract Transform Load (ETL) tasks for execution using a primary ETL pipeline;
 determine task characteristics associated with each ETL task;

determine confidentiality requirements associated with each ETL task, wherein the confidentiality requirements comprise at least security requirements of the task, source data associated with the task, transformation requirements, and a destination address;

allocate each ETL task to a corresponding ETL pipeline for execution based on the confidentiality requirements;

capture configuration information associated with the network environment at periodic time instants;

dynamically determine, using a machine learning (ML) model, one or more secondary ETL pipelines in addition to the primary ETL pipeline to process the plurality of ETL tasks based on the task characteristics, the confidentiality requirements, and the configuration information at each time instant;

configure the one or more secondary ETL pipelines to meet the confidentiality requirements of corresponding tasks; and execute the plurality of ETL tasks using the primary ETL pipeline and the one or more secondary ETL pipelines.

18. The computer program product of claim 17, wherein the code when executed further causes the apparatus to:

determine task size and priority associated with each ETL task based on the task characteristics; and allocate each ETL task to a corresponding ETL pipeline for execution based on the task size and priority.

19. The computer program product of claim 18, wherein the code when executed further causes the apparatus to:

dynamically configure each ETL pipeline based on at least the task size and priority of allocated ETL tasks.

20. The computer program product of claim 19, wherein the code when executed further causes the apparatus to:

determine data pre-processing requirements associated with the execution of each ETL task based on the task size, priority, and confidentiality requirements;

determine data pre-processing actions based on the data pre-processing requirements; and configure each ETL pipeline to implement the data pre-processing actions when executing an ETL task allocated thereto.

* * * * *